(12) United States Patent
Kato et al.

(10) Patent No.: US 7,969,278 B2
(45) Date of Patent: Jun. 28, 2011

(54) THERMISTOR

(75) Inventors: Satoshi Kato, Tokyo (JP); Hirokazu Kobayashi, Tokyo (JP); Kazuo Satou, Tokyo (JP); Tsuneki Tanaka, Tokyo (JP); Takuto Horii, Tokyo (JP)

(73) Assignee: TDK Corporation, Tokyo (JP)

( * ) Notice: Subject to any disclaimer, the term of this patent is extended or adjusted under 35 U.S.C. 154(b) by 235 days.

(21) Appl. No.: 12/493,807

(22) Filed: Jun. 29, 2009

(65) Prior Publication Data

US 2010/0052842 A1 Mar. 4, 2010

(30) Foreign Application Priority Data

Aug. 28, 2008 (JP) .................................. 2008-220106

(51) Int. Cl.
*H01C 7/10* (2006.01)
(52) U.S. Cl. ........................ 338/22 R; 338/25; 338/28
(58) Field of Classification Search ............... 338/22 R, 338/25, 28, 229; 374/185, 208; 340/618, 340/620
See application file for complete search history.

(56) References Cited

U.S. PATENT DOCUMENTS

| | | | | |
|---|---|---|---|---|
| 4,243,968 A | * | 1/1981 | Scott | 338/28 |
| 4,591,839 A | * | 5/1986 | Charboneau et al. | 340/620 |
| 5,748,656 A | * | 5/1998 | Watson et al. | 372/35 |
| 2002/0125984 A1 | * | 9/2002 | Muziol et al. | 338/28 |
| 2004/0212477 A1 | | 10/2004 | Shibayama | |

FOREIGN PATENT DOCUMENTS

JP A-11-83641 3/1999

* cited by examiner

*Primary Examiner* — Kyung Lee
(74) *Attorney, Agent, or Firm* — Oliff & Berridge, PLC

(57) ABSTRACT

A thermistor has a sealing portion of glass which seals at least a thermistor element body, first and second electrodes, and ends of the first and second lead wires and an insulating portion which covers portions of the first and second lead wires exposed from the sealing portion. The first and second lead wires are spaced from each other and include respective first portions extending from the aforementioned ends and spaced from each other with a first space, respective second portions spaced from each other with a second space larger than the first space, and respective third portions spaced from each other with a space varying from the first space to the second space, between the first and second portions. The insulating portion covers the first portions of the first and second lead wires together and covers the second and third portions of the first and second lead wires independently for each of the first and second lead wires.

3 Claims, 10 Drawing Sheets

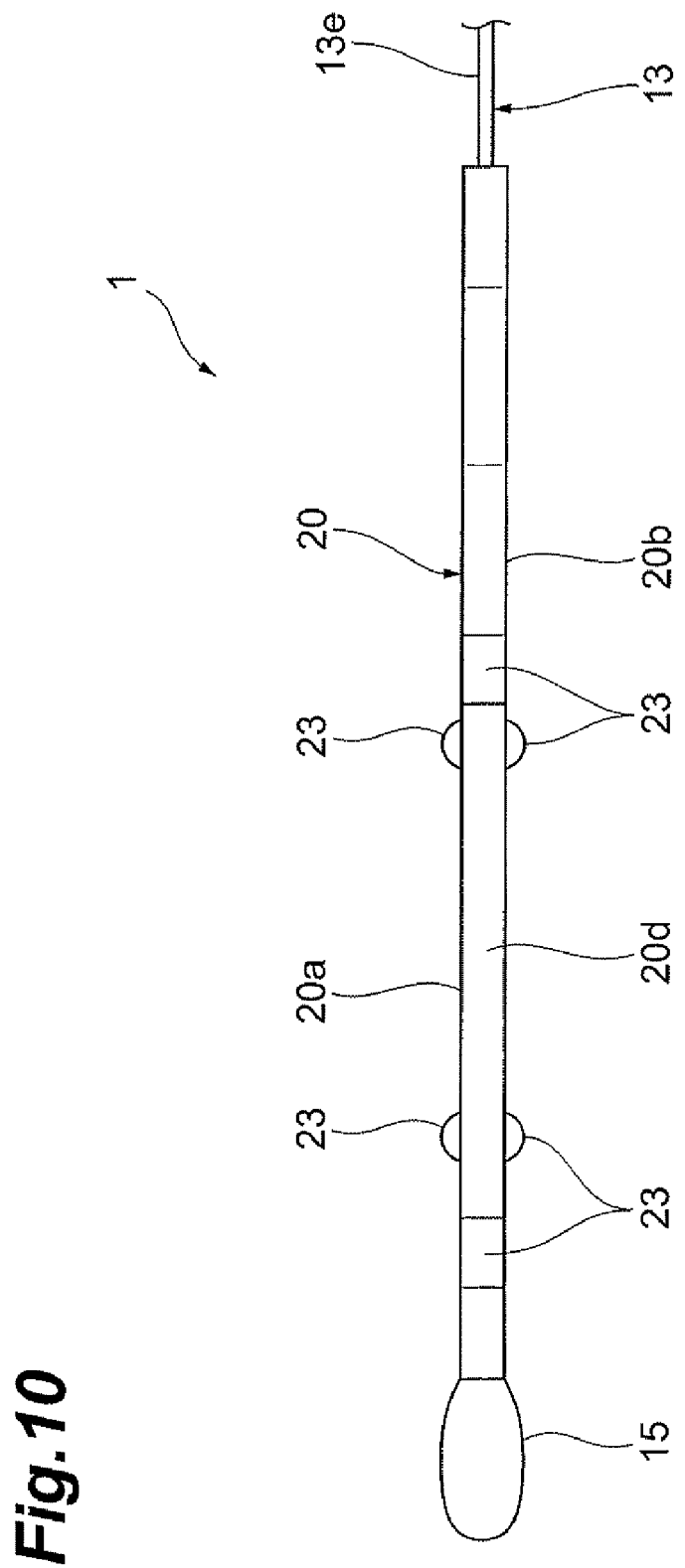

THERMISTOR

BACKGROUND OF THE INVENTION

1. Field of the Invention

The present invention relates to a thermistor.

2. Related Background Art

There is a known thermistor having a thermistor element body, a pair of electrodes arranged on the thermistor element body, and a pair of lead wires ends of which are connected to the pair of respective electrodes (e.g., Japanese Patent Application Laid-open No. 11-83641). In the thermistor described in Laid-open No. 11-83641, the thermistor element body, the pair of electrodes, and portions including the ends in the pair of lead wires are sealed with glass.

SUMMARY OF THE INVENTION

However, the thermistor described in Laid-open No. 11-83641 has the problems as described below. Namely, when an external force is made to act on exposed ends of the lead wires so as to widen a space between the lead wires, stress acts on the base part of the regions exposed from the glass in the respective lead wires, and on the glass, so that the glass may crack. Furthermore, the pair of lead wires are not electrically insulated from each other, and it could cause the pair of lead wires to contact each other to short-circuit. Occurrence of a short circuit becomes more outstanding in cases where the pair of lead wires are long.

An object of the present invention is to provide a thermistor capable of preventing the glass from cracking with an external force acting on the exposed ends of the lead wires so as to widen the space between the lead wires and capable of preventing the pair of lead wires from short-circuiting.

The present invention provides a thermistor comprising: a thermistor element body; first and second electrodes arranged on the thermistor element body; a first lead wire an end of which is connected to the first electrode; a second lead wire an end of which is connected to the second electrode; a sealing portion of glass which seals at least the thermistor element body, the first and second electrodes, and the ends of the first and second lead wires; and an insulating portion of an electrically insulating material which covers portions of the first and second lead wires exposed from the sealing portion, wherein the first and second lead wires are spaced from each other and include respective first portions extending from the aforementioned ends and spaced from each other with a first space, respective second portions spaced from each other with a second space larger than the first space, and respective third portions spaced from each other with a space varying from the first space to the second space, between the first and second portions, and wherein the insulating portion covers the first portions of the first and second lead wires together and covers the second and third portions of the first and second lead wires independently for each of the first and second lead wires.

In the present invention, the insulating portion covers the first portions of the first and second lead wires together and covers the second and third portions of the first and second lead wires independently for each of the first and second lead wires. For this reason, when an external force is made to act on the exposed ends of the first and second lead wires so as to widen the space between them, stress acts on each of the parts of the insulating portion covering the second and third portions, but the stress-acting parts are deformed so as to be wholly bent. As the parts of the insulating portion covering the second and third portions are deformed so as to be wholly bent, the acting stress is dispersed and absorbed. As a result, the stress is prevented from concentrating in the part of the insulating portion covering the first portions of the first and second lead wires, whereby this part can be prevented from cracking. In addition, the stress is also prevented from concentrating in the base parts of the lead wires exposed from the parts of the insulating portion covering the second and third portions, whereby the base parts of the lead wires and the insulating portion near the base parts can be prevented from being deformed. Therefore, no stress acts on the sealing portion of glass, whereby the sealing portion can be prevented from cracking.

In the present invention, the insulating portion of the electrically insulating material covers the first and second lead wires up to the second portions the space between which is widened to the second space, whereby the first and second lead wires are prevented from directly contacting each other, which can prevent the first and second lead wires from short-circuiting.

Preferably, a plurality of bumps are arranged on a surface of the insulating portion.

Incidentally, the thermistor can be used in a state in which at least a part of the insulating portion and, the sealing portion are hermetically enclosed in a case. The hermetical enclosure of the thermistor (sealing portion and insulating portion) into the case is carried out by packing a resin into the case in a state in which the thermistor is set in the case. In this case, a void without the resin can be formed between the insulating portion and the inner wall of the case, which could lead to a failure in the hermetical enclosure of the thermistor. However, when the plurality of bumps are arranged on the surface of the insulating portion, there are clearances formed between the inner wall of the case and the insulating portion, and the interior of the case is fully filled with the resin, without formation of the void. As a consequence, the thermistor can be securely hermetically enclosed.

Preferably, the insulating portion and the plurality of bumps are comprised of resin. In this case, processability of the insulating portion and bumps is improved and it thus becomes easier to form the insulating portion and bumps in desired shape.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 10 is a side view showing the further modification example of the thermistor according to the embodiment.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference symbols, without redundant description.

Figure 1:
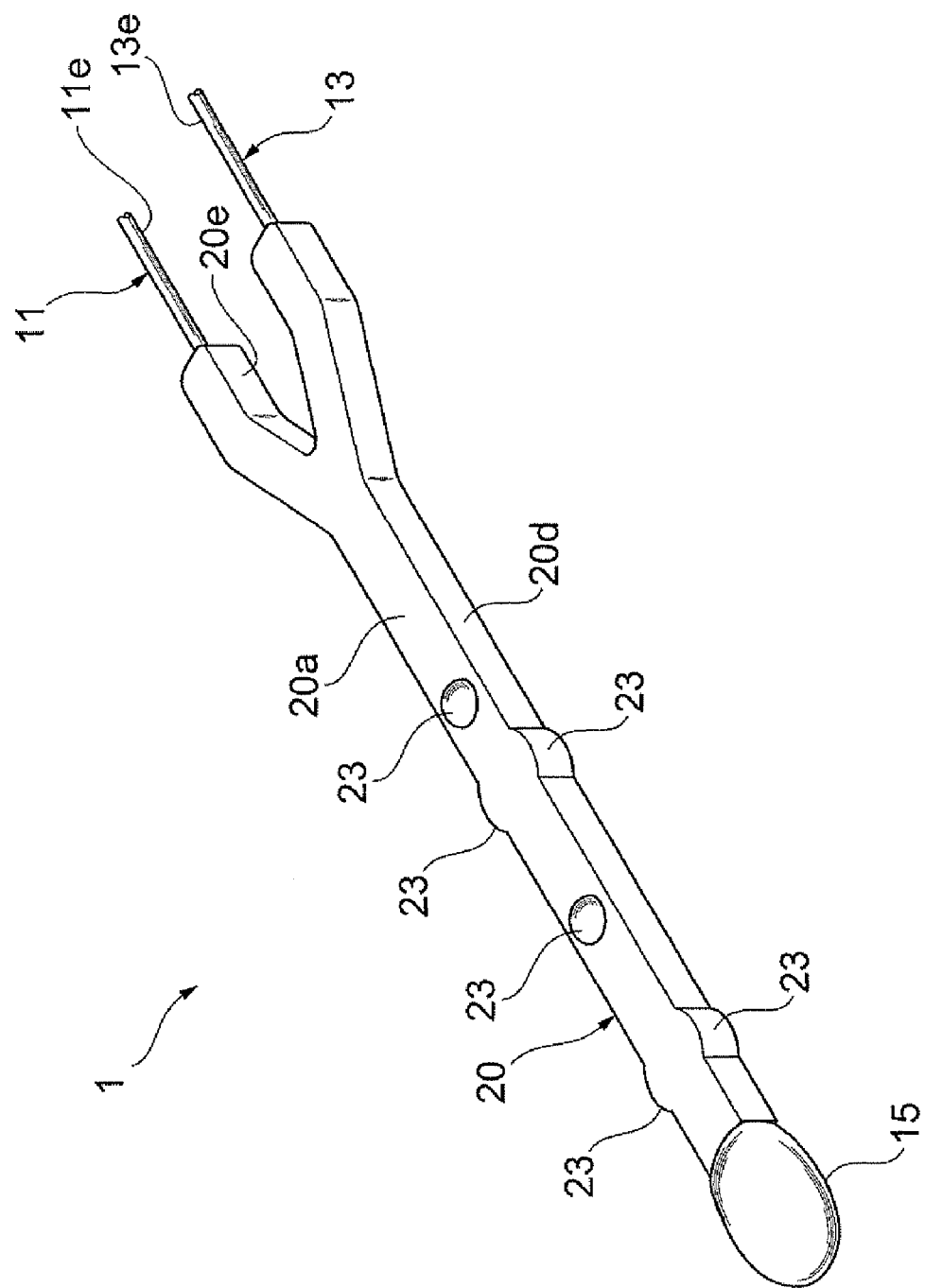
FIG. 1 is a perspective view showing a thermistor according to an embodiment of the present invention.
Figure 2:
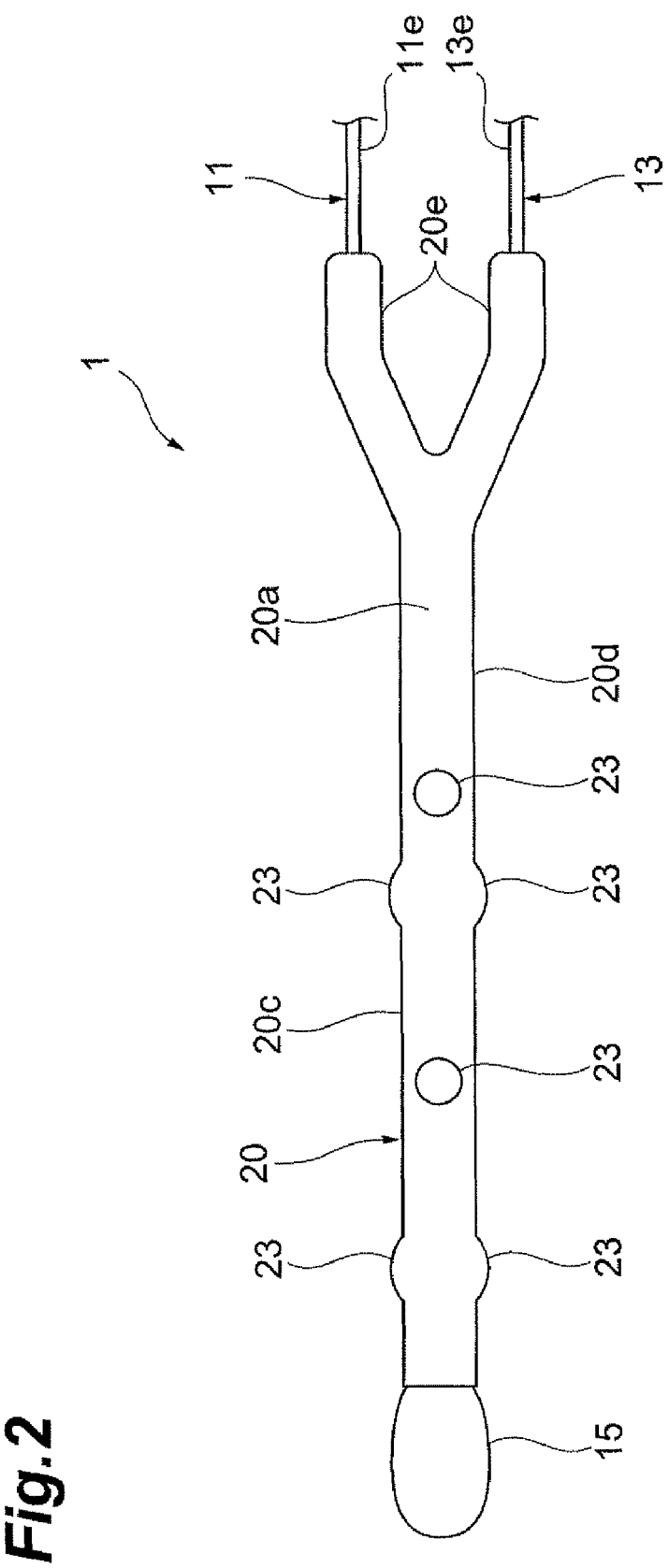
FIG. 2 is a plan view showing the thermistor according to the embodiment.
Figure 3:
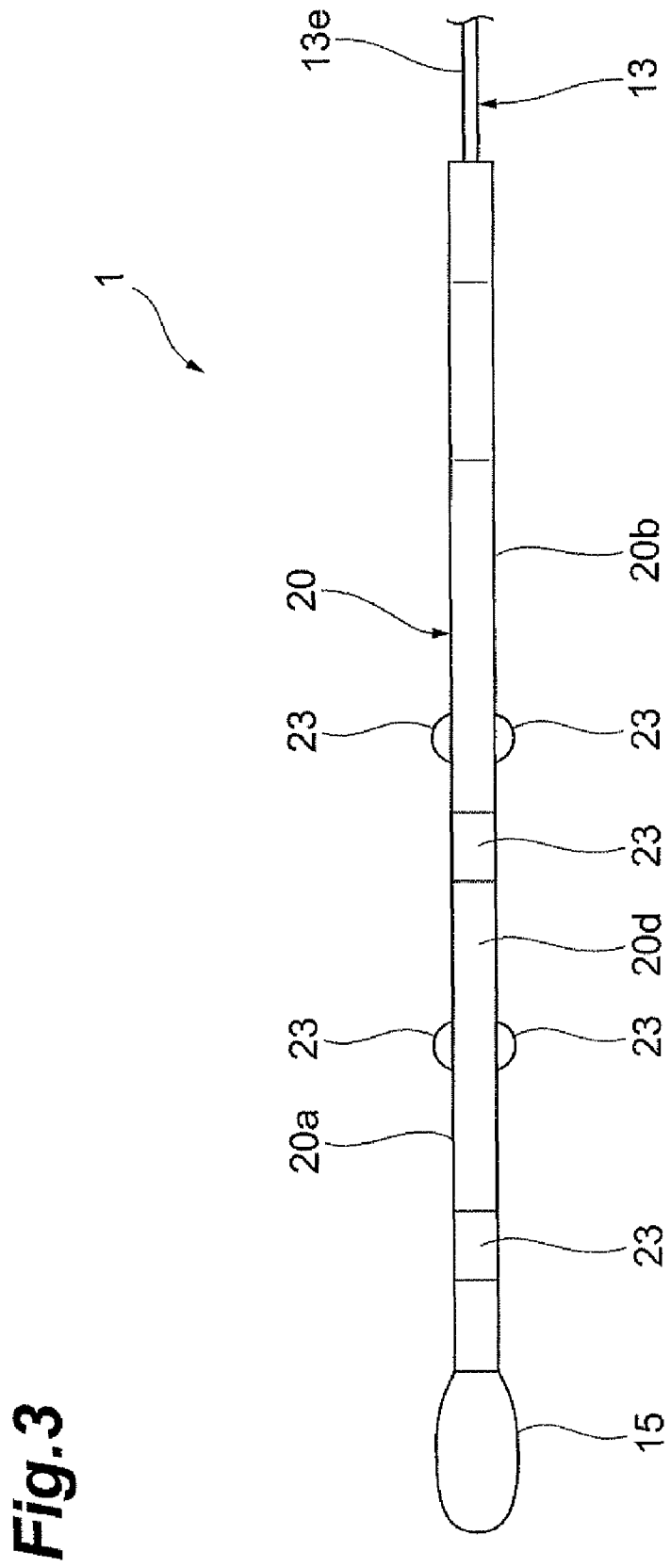
FIG. 3 is a side view showing the thermistor according to the embodiment.
Figure 4:
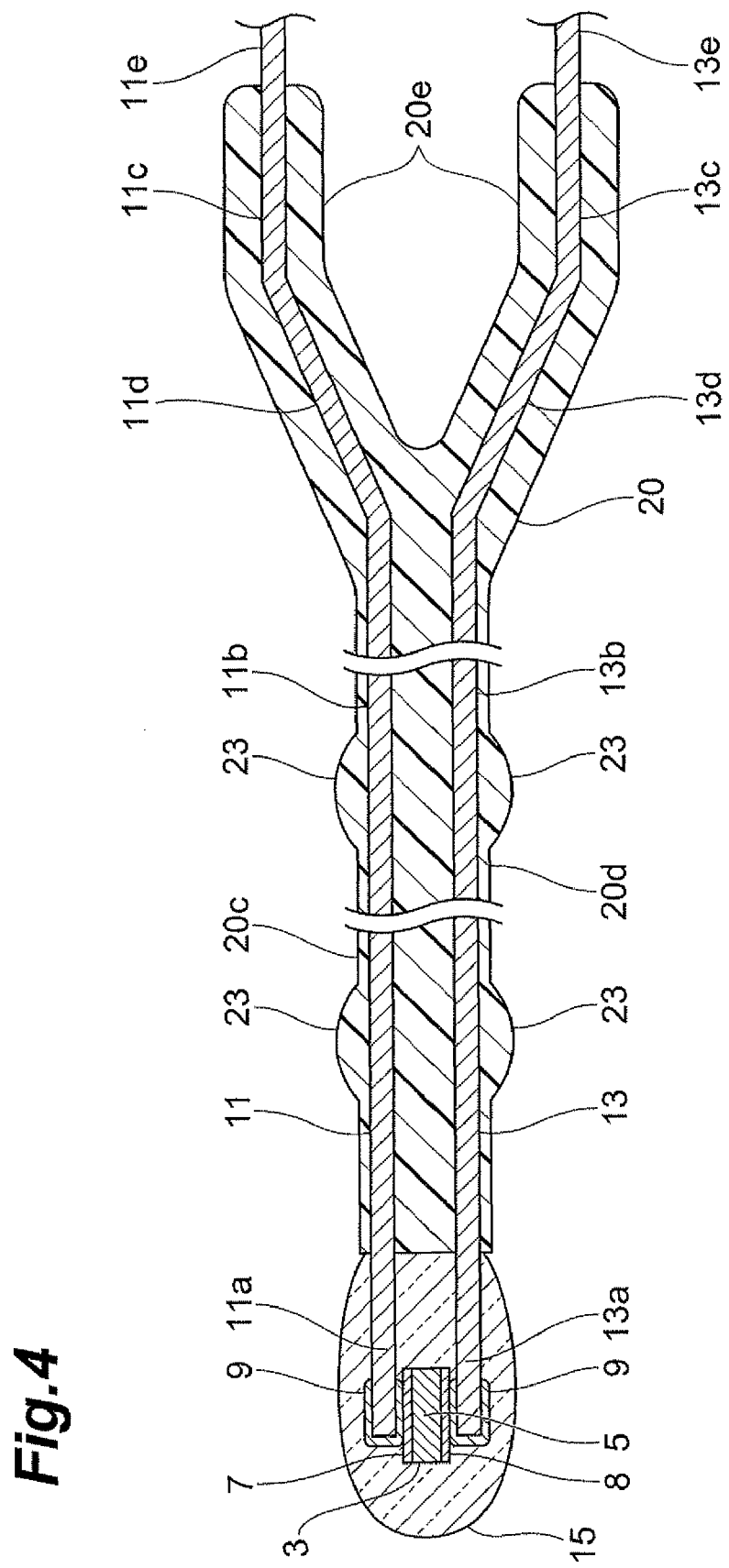
FIG. 4 is a drawing showing a sectional configuration of the thermistor according to the embodiment.

A configuration of a thermistor according to an embodiment of the present invention will be described with reference to FIGS. 1 to 3. FIG. 1 is a perspective view showing the thermistor according to the present embodiment. FIG. 2 is a plan view showing the thermistor according to the present embodiment. FIG. 3 is a side view showing the thermistor according to the present embodiment. FIG. 4 is a drawing showing a sectional configuration of the thermistor according to the present embodiment.

The thermistor 1, as shown in FIGS. 1 to 4, has a thermistor element 3, a first lead wire 11, a second lead wire 13, a sealing portion 15, and an insulating portion 20.

The thermistor element 3 is, for example, a so-called NTC (Negative Temperature Coefficient) thermistor element having a property of decreasing resistance with increasing temperature. The thermistor element 3 has a thermistor element body 5, a first electrode 7, and a second electrode 8.

The thermistor element body 5 is a sintered body of a metal oxide (e.g., an oxide of Mn, Co, Ni, Fe, Al, or the like) and is formed in a nearly rectangular paralleled shape. The first electrode 7 and the second electrode 8 are placed on two end faces of the thermistor element body 5 and are electrically connected to the thermistor element body 5. The first and second electrodes 7, 8 are made of metal (e.g., Au, Ag, Pd, an Ag—Pd alloy, or the like).

The first lead wire 11 and the second lead wire 13 are arranged with a space between them. The first and second lead wires 11, 13 are made of an electroconductive material (e.g., Ni, Cu, Co, or Fe). One end 11a of the first lead wire 11 and one end 13a of the second lead wire 13 are covered each by joint electrode 9. The one end 11a of the first lead wire 11 is electrically connected through the joint electrode 9 to the first electrode 7. The one end 13a of the second lead wire 13 is electrically connected through the joint electrode 9 to the second electrode 8. The joint electrodes 9 are made of metal (e.g., Au, Ag, Pd, an Ag—Pd alloy, or the like).

The first lead wire 1 includes a first portion 11b extending from the one end 11a, a second portion 11c, and a third portion 11d. The second lead wire 13 includes a first portion 13b extending from the one end 13a, a second portion 13c, and a third portion 13d. The first portion 11b and the first portion 13b are arranged with a space between them which is set to a first space, and are approximately parallel to each other. The second portion 11c and the second portion 13c are arranged with a space between them which is set to a second space larger than the first space, and are approximately parallel to each other. The third portion 11d and the third portion 13d are arranged with a space between them which is set so as to gradually vary from the first space to the second space, between the first portion 11b, 13b and the second portion 11c, 13c. In the present embodiment, the first space is set at about 0.6 mm, and the second space at about 4 mm.

The sealing portion 15 is made of glass and is formed in an ellipsoidal shape whose major axis is the extending direction of the first and second lead wires 11, 13. The sealing portion 15 hermetically seals the thermistor element body 5, the first and second electrodes 7, 8, and the one ends 11a, 13a of the first and second lead wires 11, 13. The glass forming the sealing portion 15 is, for example, a glass whose glass transition temperature is approximately 400-700° C.

The insulating portion 20 is made of an electrically insulating material (e.g., epoxy resin, polyurethane resin, silicone resin, acrylic resin, a composite resin material thereof, or the like). The insulating portion 20 covers portions of the first and second lead wires 11, 13 exposed from the sealing portion 15. More particularly, the insulating portion 20 covers the first portions 11b, 13b of the first and second lead wires 11, 13 together and covers the second and third portions 11c, 11d, 13c, 13d of the first and second lead wires 11, 13 independently for each of the first and second lead wires 11, 13. In this configuration, the insulating portion 20 has such a shape that the part covering the first portions 11b, 13b of the first and second lead wires 11, 13 is bifurcated into the parts covering the second and third portions 11c, 11d, 13c, 13d of the first and second lead wires 11, 13.

The insulating portion 20 is in contact with the sealing portion 15. The other ends 11e, 13e of the first and second lead wires 11, 13 are exposed from the insulating portion 20.

The insulating portion 20 has a rectangular cross section when cut by a plane perpendicular to the lead wires 11, 13. Namely, the insulating portion 20 has, as its exterior surface, first and second faces 20a, 20b approximately parallel to a plane including the first and second lead wires 11, 13, and third to fifth faces 20c-20e extending so as to connect the first and second faces 20a, 20b.

A plurality of bumps 23 are arranged on the surface of the part of the insulating portion 20 covering the first portions 11b, 13b of the first and second lead wires 11, 13. Specifically, the bumps 23 are arranged on the first to fourth faces 20a-20d of the part covering the first portions 11b, 13b of the first and second lead wires 11, 13. The bumps 23 are provided so that a plurality of bumps (two bumps in the present embodiment) are arranged on each face 20a-20d. Each of the bumps 23 is made of an electrically insulating material (e.g., epoxy resin, polyurethane resin, silicone resin, acrylic resin, a composite resin material thereof, or the like) and is formed integrally with the insulating portion 20.

In the present embodiment, the bumps 23 arranged on the first face 20a are located at the same positions as the bumps 23 arranged on the second face 20b, in the extending direction of the first and second lead wires 11, 13. The bumps 23 arranged on the third face 20c are located at the same positions as the bumps 23 arranged on the fourth face 20d, in the extending direction of the first and second lead wires 11, 13. The bumps 23 arranged on the first and second faces 20a, 20b are located at the positions different from those of the bumps 23 arranged on the third and fourth faces 20c, 20d, in the extending direction of the first and second lead wires 11, 13.

The below will describe a production method of the thermistor 1 according to the present embodiment.

First, raw material powders of the thermistor element body 5 are wetly mixed by a ball mill or the like to prepare a raw mixture of the raw material powders mixed at a desired composition ratio. This raw mixture is dried and thereafter pre-fired at about 800-1200° C. to obtain a pre-fired product. The pre-fired product thus obtained is wetly pulverized again by a ball mill or the like. Then a binder (e.g., polyvinyl alcohol (PVA) or the like) is added into this pulverized product, granulated into granules, and thereafter formed under pressure. Then the formed body is subjected to debindering and main firing, and the resultant is cooled and cut in a predetermined size to obtain the thermistor element body 5.

Then an electroconductive paste containing Au as a major component is applied onto two end faces of the obtained thermistor element body 5, for example, by a transfer method and is sintered to form the first and second electrodes 7, 8. Then the one ends 11*a*, 13*a* of the first and second lead wires 11, 13 are covered by an electroconductive paste and are brought into contact with the corresponding electrodes 7, 8. Thereafter, the electroconductive paste is subjected to debindering. The electroconductive paste contains, for example, Au and a binder (e.g., polyvinyl alcohol (PVA) or the like).

Next, the thermistor element body 5, the first and second electrodes 7, 8, and the one ends 11*a*, 13*a* of the first and second lead wires 11, 13 are put into a glass tube and the glass tube is heated to hermetically seal them. In the present embodiment, for example, the hermetical sealing is implemented in air. The hermetical sealing may also be carried out in an inert atmosphere of $N_2$, Ar, He, or the like. The glass tube melted by heat forms the sealing portion 15 of the ellipsoidal shape whose major axis is the extending direction of the lead wires 11, 13. This heating process results in forming the joint electrodes 9 of Au contained in the electroconductive paste, at the one ends 11*a*, 13*a* of the first and second lead wires 11, 13, and bonding the joint electrodes 9 to the respective electrodes 7, 8.

Next, the insulating portion 20 is formed. The insulating portion 20 can be formed, for example, by injection molding. In the injection molding, a die having a cavity corresponding to the insulating portion 20 and bumps 23 is prepared, and the first to third portions 11*b*, 11*c*, 11*d*, 13*b*, 13*c*, 13*d* of the first and second lead wires 11, 13 are set in the cavity of the die so that the sealing portion 15 and the other ends of the first and second lead wires 11, 13 are exposed from the die. Then the interior of the cavity is filled with resin and the filling resin is cured. This process results in forming the insulating portion 20 and the bumps 23. The above provides the thermistor 1.

In the present embodiment, as described above, the insulating portion 20 covers the first portions 11*b*, 13*b* of the first and second lead wires 11, 13 together and covers the second and third portions 11*c*, 11*d*, 13*c*, 13*d* of the first and second lead wires 11, 13 independently for each of the first and second lead wires 11, 13. For this reason, when an external force is made to act on the exposed other ends 11*e*, 13*e* of the first and second lead wires 11, 13 so as to widen the space between them, stress acts on each of the parts of the insulating portion 20 covering the second and third portions 11*c*, 11*d*, 13*c*, 13*d*, but the stress-acting parts are deformed so as to be wholly bent.

As the parts of the insulating portion 20 covering the second and third portions 11*c*, 11*d*, 13*c*, 13*d* are deformed so as to be wholly bent, the acting stress is dispersed and absorbed. As a result, the stress is prevented from concentrating in the part of the insulating portion 20 covering the first portions 11*b*, 13*b* of the first and second lead wires 11, 13, whereby this part can be prevented from cracking. Furthermore, the stress is also prevented from concentrating in the base parts of the lead wires 11, 13 exposed from the parts of the insulating portion 20 covering the second and third portions 11*c*, 11*d*, 13*c*, 13*d*, which can prevent the base parts of the lead wires 11, 13 and the insulating portion 20 near the base parts (the parts covering the second and third portions 11*c*, 11*d*, 13*c*, 13*d*) from being deformed. Therefore, no stress acts on the sealing portion 15, whereby the sealing portion 15 can be prevented from cracking.

In the present embodiment, the insulating portion 20 covers the first and second lead wires 11, 13 up to the second portions 11*c*, 13*c*, and this prevents the exposed portions of the first and second lead wires 11, 13 from directly contacting each other, which can prevent the first and second lead wires 11, 13 from short-circuiting.

In the present embodiment, the insulating portion 20 and the bumps 23 are made of resin. In this case, processability of the insulating portion 20 and bumps 23 is improved, whereby it becomes easier to form the insulating portion 20 and bumps 23 in desired shape.

Figure 5:
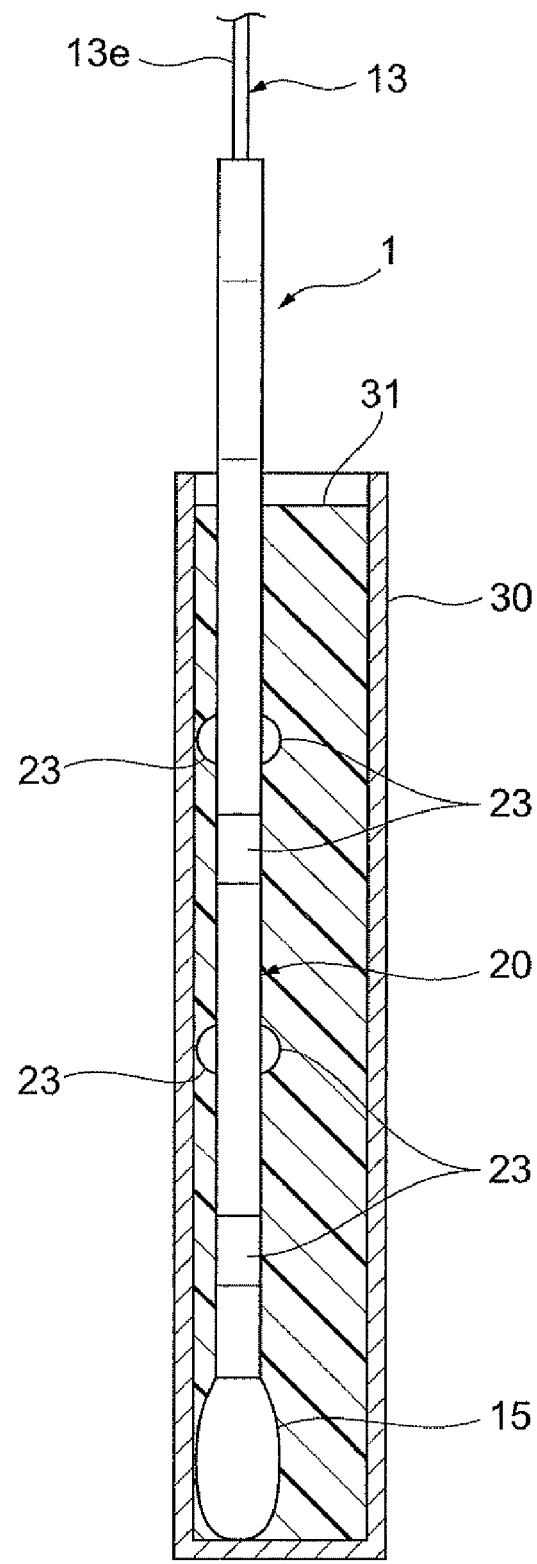
FIG. 5 is a drawing showing a type of usage of the thermistor according to the embodiment.
Figure 6:
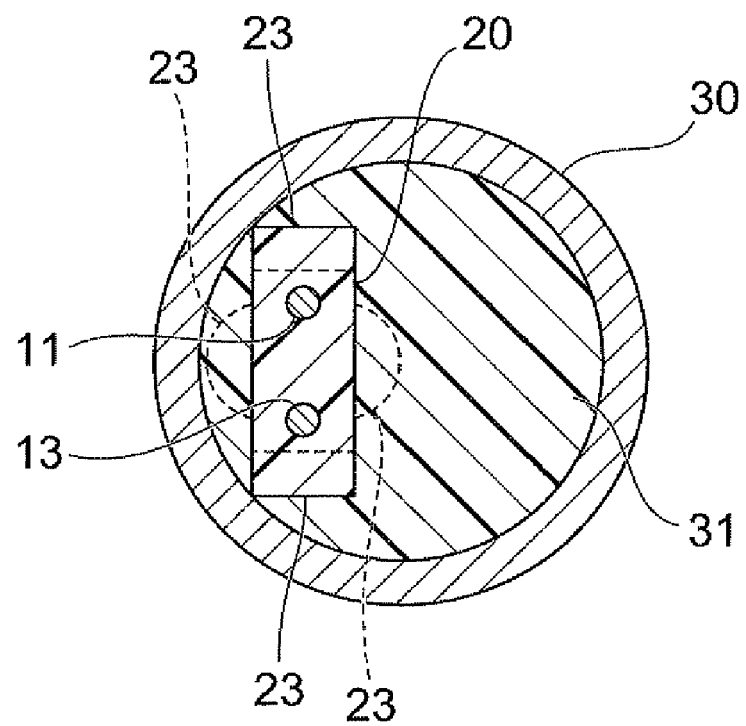
FIG. 6 is a drawing showing the type of usage of the thermistor according to the embodiment.

The thermistor 1 can be used in a state in which at least a part of the insulating portion 20 (the part covering the first portions 11*b*, 13*b* of the first and second lead wires 11, 13 in the present embodiment) and the sealing portion 15 are hermetically enclosed in a case 30, as shown in FIGS. 5 and 6, depending upon a type of usage. In this case, the part of the insulating portion 20 located in the case 30, and the sealing portion 15 are hermetically enclosed in the case 30 with resin 31. FIG. 5 shows the case 30 and resin 31 in section as hatched regions.

For hermetically enclosing the part of the insulating portion 20 covering the first portions 11*b*, 13 *b* of the first and second lead wires 11, 13, and the sealing portion 15 in the case 30 with resin 31, a resin material is packed into the case 30 in a state in which the thermistor 1 is placed in the case 30, and the packed resin material is cured. In this case, depending upon the position of the thermistor 1 in the case 30, a void without the resin material can be formed between the insulating portion 20 and the inner wall of the case 30, and it could lead to a failure in appropriate hermetical enclosure of the thermistor 1 (sealing portion 15). If the thermistor 1 (sealing portion 15) is not appropriately hermetically enclosed, heat will not be properly conducted to the thermistor element 3. Furthermore, water or the like can penetrate into the foregoing void and it could degrade the insulating property of the thermistor 1.

In the present embodiment, however, since the bumps 23 are arranged on the surface of the part of the insulating portion 20 covering the first portions 11*b*, 13*b* of the first and second lead wires 11, 13, there are clearances formed between the inner wall of the case 30 and the insulating portion 20, and thus the entire interior of the case 30 can be filled with the resin material, thereby preventing the void without the resin 31 from being formed. As a consequence, the thermistor 1 can be securely hermetically enclosed.

The above described the preferred embodiment of the present invention, but it should be noted that the present invention is by no means limited to the above-described embodiment and that the present invention can be modified in various ways without departing from the spirit and scope of the invention.

Figure 7:
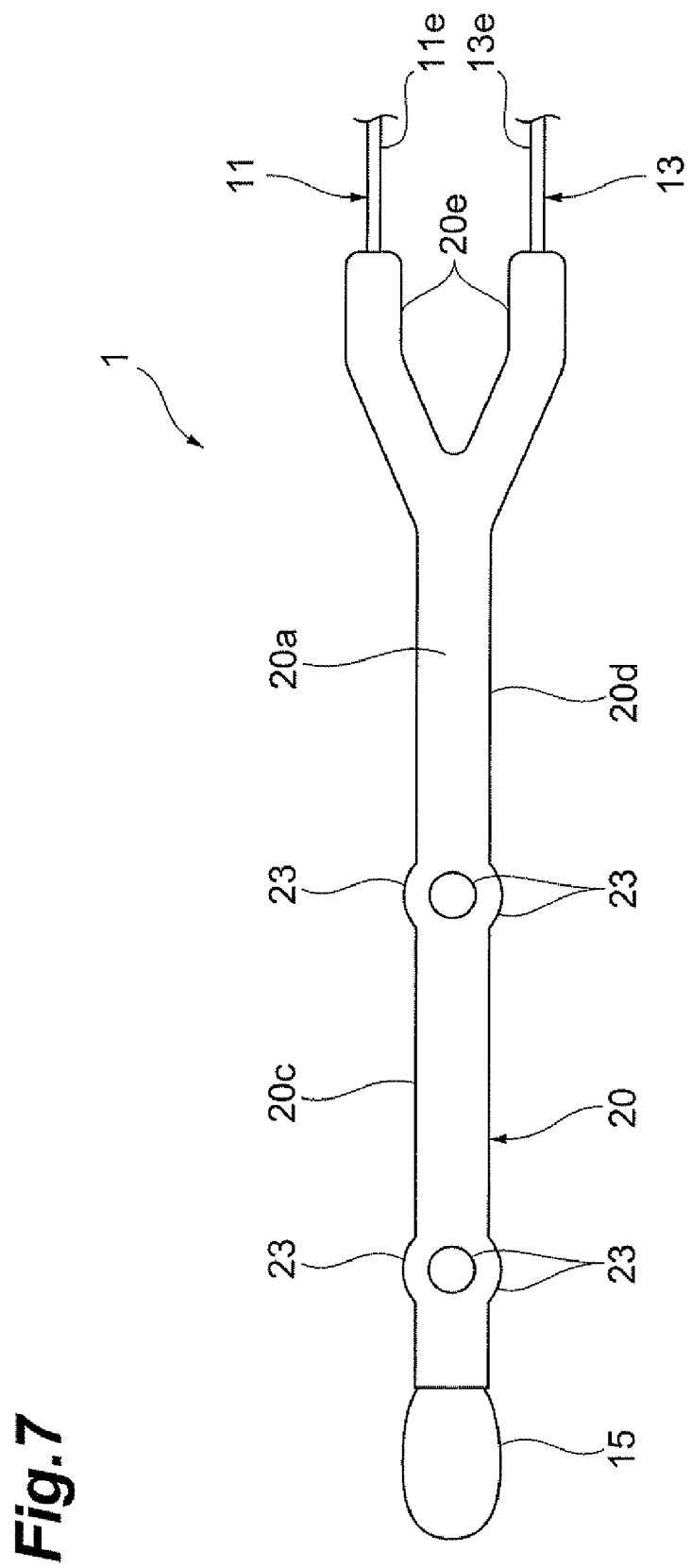
FIG. 7 is a plan view showing a modification example of the thermistor according to the embodiment.
Figure 8:
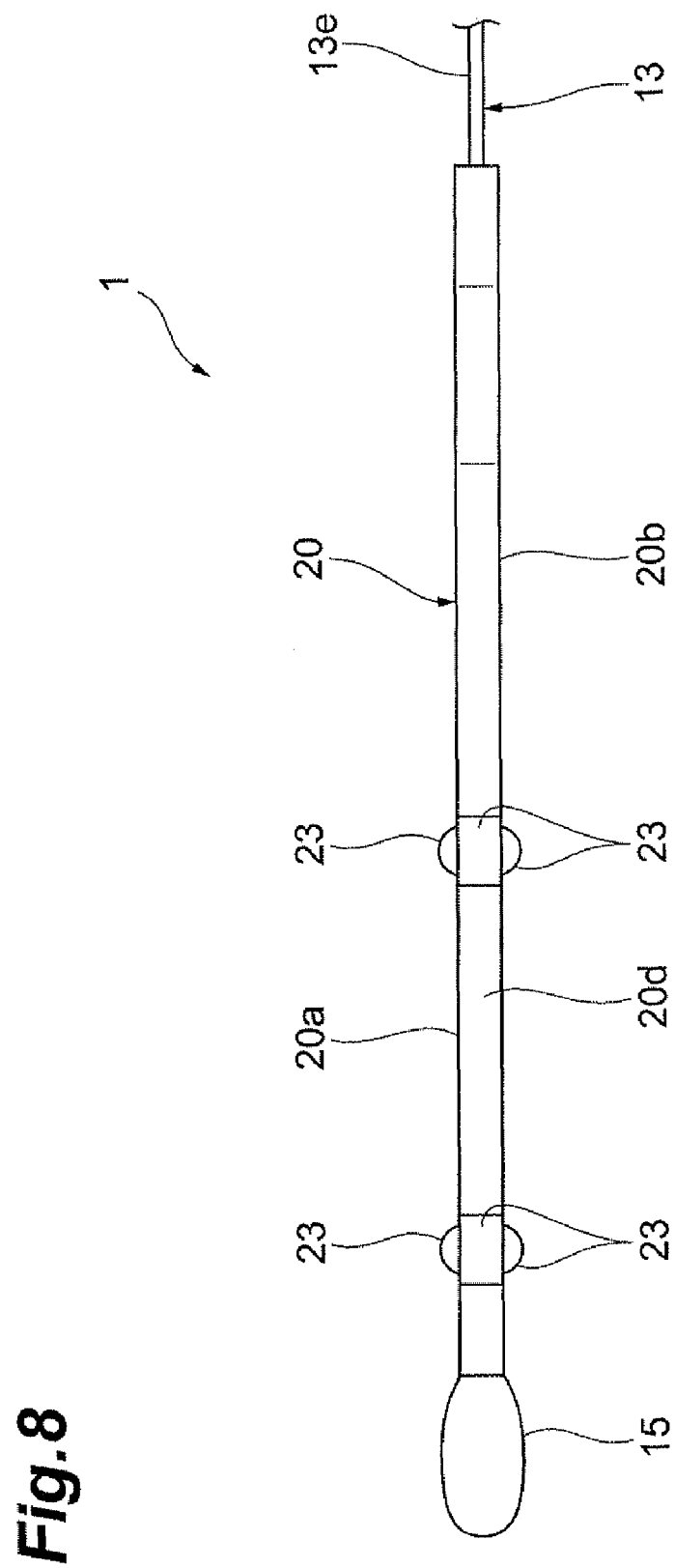
FIG. 8 is a side view showing the modification example of the thermistor according to the embodiment.
Figure 9:
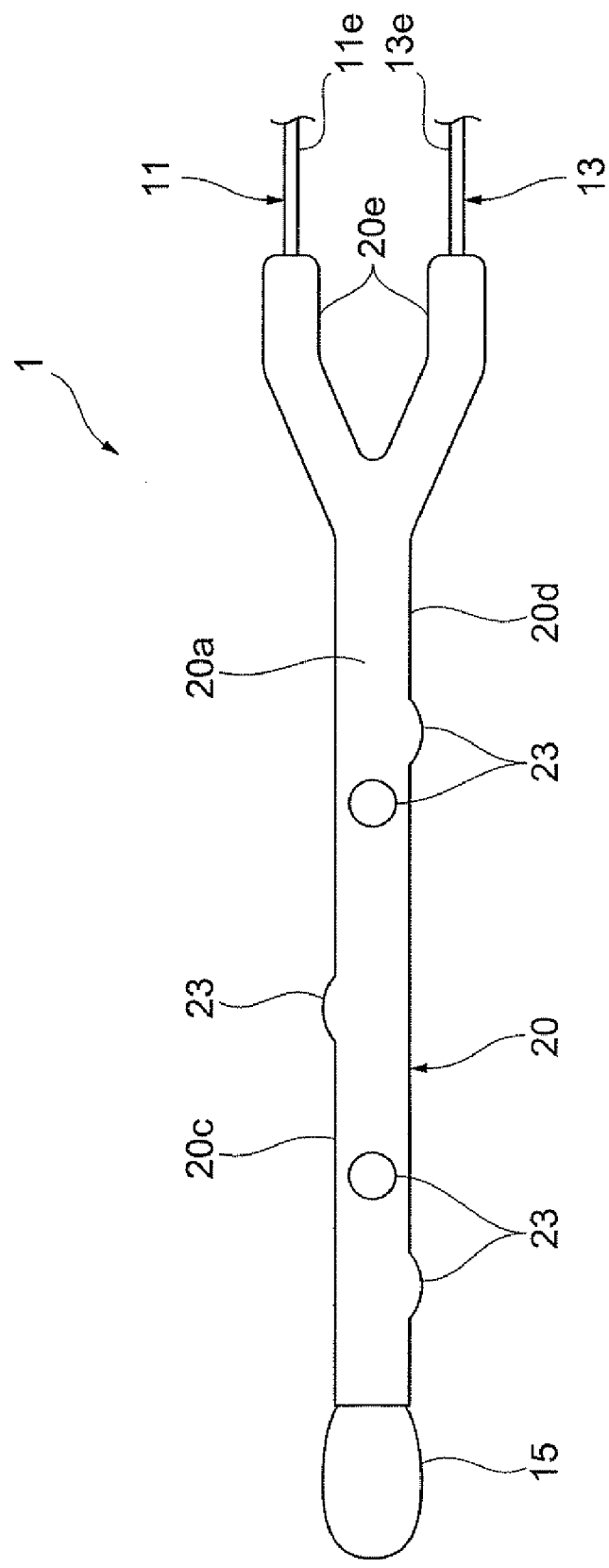
FIG. 9 is a plan view showing a further modification example of the thermistor according to the embodiment.

The positions and the number of bumps 23 arranged on the surface of the insulating portion 20 are not limited to those in the above embodiment. As shown in FIGS. 7 and 8, the bumps 23 may be arranged at the same positions on the first to fourth faces 20*a*-20*d* of the insulating portion 20. As shown in FIGS. 9 and 10, the bumps 23 on the third and fourth faces 20*c*, 20*d* may be arranged all at different positions, in the extending direction of the first and second lead wires 11, 13.

Each bump 23 does not have to be formed integrally with the insulating portion 20, and each bump 23 may be formed as a separate body from the insulating portion 20.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A thermistor comprising:
   a thermistor element body;
   first and second electrodes arranged on the thermistor element body;
   a first lead wire an end of which is connected to the first electrode;
   a second lead wire an end of which is connected to the second electrode;
   a sealing portion of glass which seals at least the thermistor element body, the first and second electrodes, and the ends of the first and second lead wires; and
   an insulating portion of an electrically insulating material which covers portions of the first and second lead wires exposed from the sealing portion,
   wherein the first and second lead wires are spaced from each other and include respective first portions extending from said ends and spaced from each other with a first space, respective second portions spaced from each other with a second space larger than the first space, and respective third portions spaced from each other with a space varying from the first space to the second space, between the first and second portions, and
   wherein the insulating portion covers the first portions of the first and second lead wires together and covers the second and third portions of the first and second lead wires independently for each of the first and second lead wires.

2. The thermistor according to claim 1, wherein a plurality of bumps are arranged on a surface of the insulating portion.

3. The thermistor according to claim 2, wherein the insulating portion and the plurality of bumps are comprised of resin.

* * * * *